Fig. 2.

INVENTOR
GRADY L. PAYNE,

AGENT

INVENTOR
GRADY L. PAYNE,
BY Andrew L. Gaboriault
AGENT

INVENTOR
GRADY L. PAYNE,
BY Andrew L. Jaboriault
AGENT

United States Patent Office 2,834,721
Patented May 13, 1958

2,834,721

METHOD AND APPARATUS FOR THE CONTROLLED WITHDRAWAL OF GRANULAR SOLIDS FROM A LIQUID-GRANULAR SOLIDS CONTACTING ZONE

Grady L. Payne, Mickleton, N. J., assignor to Socony Mobil Oil Company, Inc., a corporation of New York Application August 26, 1953, Serial No. 376,687

5 Claims. (Cl. 196—147)

This invention deals with a method and apparatus for contacting liquids with granular solids. It is particularly concerned with a method and apparatus for the controlled withdrawal of granular solids from the contacting zone of a liquid-granular solids contacting process.

Typical of the processes to which this invention applies is the process for the continuous countercurrent contacting of liquid hydrocarbon oils, such as mineral oil, with a granular adsorbent, such as fuller's earth, for the purpose of decolorizing the oil and removing small amounts of impurities therefrom. Other typical processes include the continuous treatment of water with granular zeolites and the liquid phase conversion of hydrocarbons to variable liquid products.

This invention will be best understood by referring to the attached drawings, of which.

All of these drawings are diagrammatic in form and like parts in all bear like numerals.

In processes of the aforementioned types, as well as many others wherein granular solids are passed as a columnar mass through the liquid-granular solids contacting zone, it is necessary to carefully control the rate of granular solids removal from the contacting zone, so that the ratio of liquid to granular solids within the contacting zone can be maintained at some single desired value optimum for efficient treating. The granular solids must usually be removed from the contacting zone as a slurry with some of the liquid charge. Such a slurry will frequently exhibit flow characteristics which make it impossible to effectively control the rate of granular solids removal by a variable area flow restriction, such as a valve. This is thought to be due to a change in composition of the slurry with changing flow restriction area.

Figure 1:
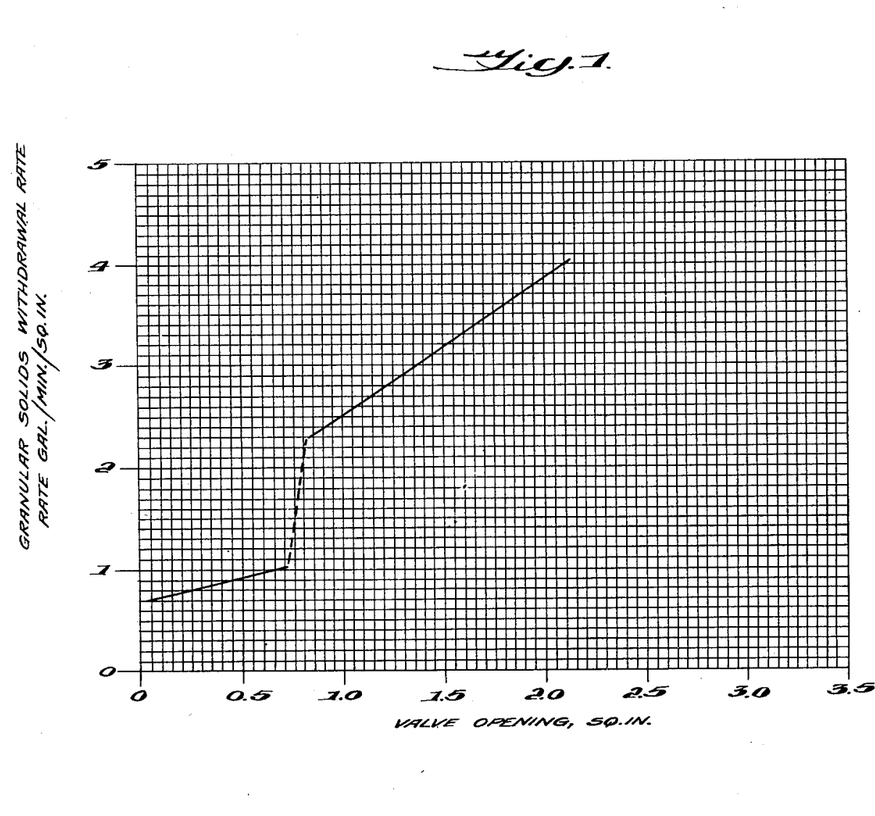
Figure 1 is a graph showing the variation of granular solids withdrawal rate with the area of a control valve opening in a mineral oil contacting system.

Figure 1 illustrates the flow control obtained by using a valve in the withdrawal line from the treater of a continuous mineral oil treating process which uses a granular adsorbent. It is apparent from this graph that the slurry stream passes through three separate stages as the valve is opened. First, there is a plastic or viscous flow condition in which the rate through the valve progresses regularly with the valve opening. Next, there is a transient stage wherein the flow rate rises markedly with only a slight increase in valve opening and is very erratic. Last, there is a turbulent stage wherein the flow rate may again be easily controlled by a valve.

These three stages are typical of materials which behave as non-Newtonian fluids, i. e., fluids whose viscosity varies with the rate of shear on the fluid stream, rather than typical Newtonian fluids, i. e., fluids whose viscosity is independent of the rate of shear. It is believed that, in the viscous or plastic stage, the granular solids particles in the slurry stream are substantially all touching or resting upon each other, while in the turbulent stage the particles are substantially all separated from each other. It is obvious that in the transient stage the rate is uncontrollable by the valve. It is likewise obvious that in many processes it will be desired to control the flow at a point which lies within the transient range.

A major object of this invention is to provide a method and apparatus for the removal of granular solids from a liquid-granular solids contacting zone which overcomes the above-described difficulty.

Another object is to provide a method and apparatus for the controlled withdrawal of granular solids from a liquid-granular solids contacting chamber.

Another object of this invention is to provide a method and apparatus for the removal of granular solids from a chamber in which a liquid hydrocarbon oil is being contacted with the granular solids.

These and other objects of this invention will be apparent from the following discussion.

Broadly, in this invention, a slurry stream of liquid and granular solids is removed from the liquid-granular solids contacting zone through a confined drain or discharge passage. The slurry stream is in liquid type flow while in the passage and is discharged therefrom onto a moving, perforated or foraminous surface through which liquid will pass but granular solids will not. Liquid separates from the slurry stream and passes through this surface, thereby altering the character of the stream from liquid type flow to a wet mass of granular solids. These solids accumulate beneath the discharge passage and form an accumulation or pile which acts to impede the flow of granular solids from the passage. The rate of granular solids removal through the passage may then be controlled by controlling the distance between the lower end of the passage and the surface and the rate of movement of the surface or either one alone.

The term "liquid type flow" and similar terms are used herein in describing and claiming this invention to refer to a slurry stream having a liquid-granular solids composition such that the stream, if left in that condition, would flow in about the same manner as a liquid and thus would flow around corners and along a horizontal conduit. This is to be distinguished from a stream which exists as a "wet mass of granular solids." This term is used to refer to a stream having a liquid-granular solids composition such that the stream has the characteristics of granular solids flow and thus will not flow downwardly through any passage which is not inclined with the horizontal by an amount at least equal to the angle of repose of the granular solids under the influence of high pressures. When the slurry stream is in liquid type flow, it may be in any one of the viscous, turbulent or transient conditions previously noted in connection with Figure 1. When the stream exists as a wet mass of granular solids, it can only be in the viscous condition. However, every stream in the viscous condition may not exist as a wet mass of granular solids but some may be in liquid type flow, especially as the transient condition is approached.

For some slurries, on the other hand, it may be that every composition which gives a stream in the viscous condition is a composition at which the stream acts like a wet mass of granular solids.

This invention should preferably be used with systems employing solids which are of palpable particulate form as distinguished from finely divided powders, and the term "granular" should be understood to refer to solids of this form. The solids may take the form of pellets, capsules, spheres, or the like, or solids of irregular shape such as are obtained from grinding and screening operations. Granular solids for treating liquid mineral oils generally should be within the size range 4–100 mesh, and preferably 10–60, and still more preferably 30–60 mesh by Tyler standard screen analysis.

The broader claims in U. S. patent application Serial No. 376,686, filed August 26, 1953, are intended to generically cover the devices disclosed in this application.

Figure 2:
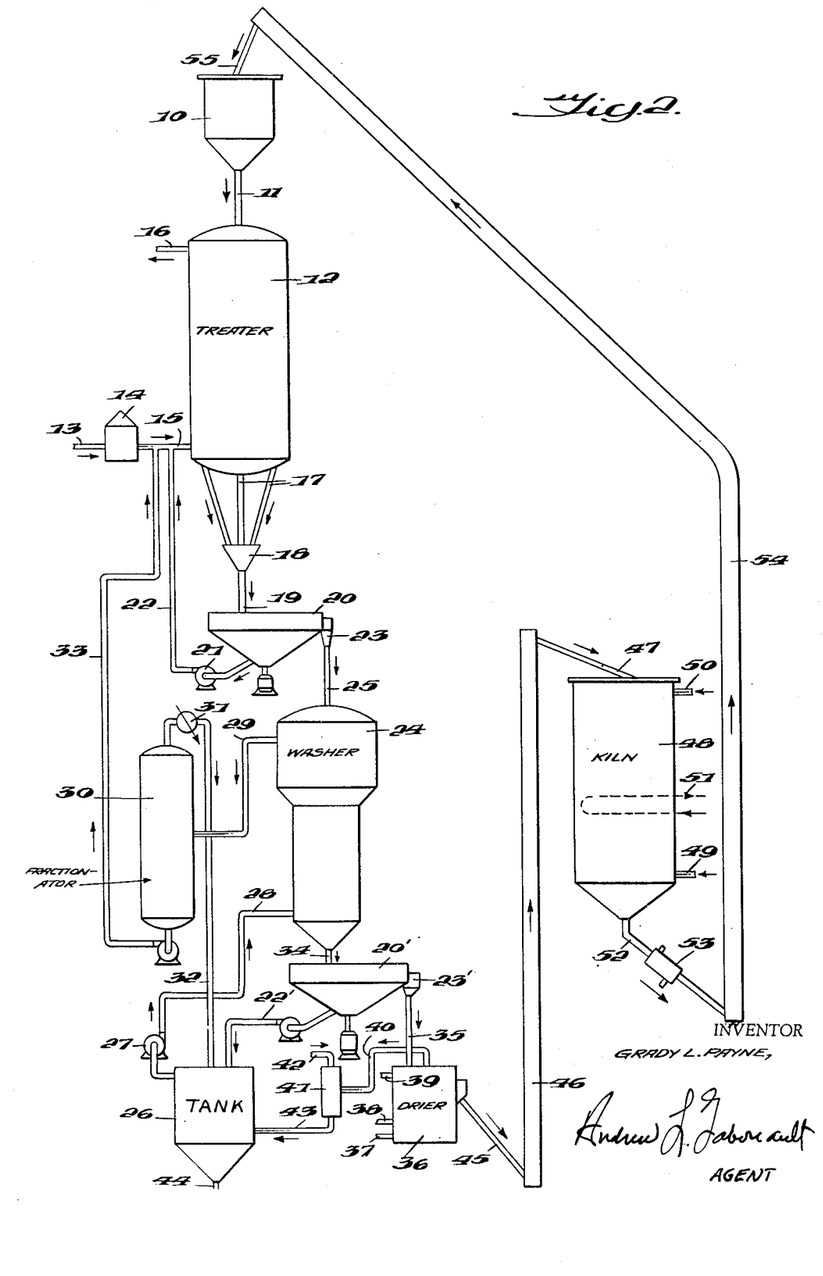
Figure 2 is a highly diagrammatic flow sheet of a continuous mineral oil percolation process to which this invention may be applied.

Turning now to Figure 2, there is shown therein the flow plan of a recently developed commercial process for removing small amounts of impurities, such as color bodies, from liquid hydrocarbon oils by percolation of the oils through a moving mass of granular adsorbent. This process is described in detail and claimed in U. S. patent application Serial No. 177,408, filed August 3, 1950, now Patent No. 2,701,786. A supply of a suitable granular adsorbent is maintained within hopper 10. Typical adsorbents which may be used in this process include fuller's earth, bauxite, bentonite, charcoal, magnesium silicate, heat and acid activated kaolin and activated carbon. Synthetic silica or alumina or silica-alumina gel adsorbents may also be employed. The purposes for which the liquid oil may be treated include decolorization, neutralization and removal of dissolved or suspended impurities, such as carbon or coke or oxygen and nitrogen containing impurities, and other gum forming compounds.

The fresh adsorbent gravitates from supply hopper 10 through passage 11 into the upper section of treater 12. Adsorbent passes through the treating or contacting zone within treater 12 as a downwardly moving columnar mass. The liquid hydrocarbon charge oil enters the system through passage 13. It is heated to the desired treating temperature by passage through heater 14. The treating temperature may lie within the range 0–700° F. and should generally be below the flash point of the oil. In a typical operation for decolorizing a mineral oil, the treating temperature might be about 300° F. The heated liquid charge passes through passage 15 into the lower section of the contacting zone within treater 12 and then passes upwardly through the downwardly moving columnar mass of adsorbent at a velocity below that which would disrupt the mass to effect the desired treatment. The treated product is removed from the upper section of treater 12 through passage 16. The used adsorbent and some liquid oil pass as a plurality of slurry streams in liquid type flow from the lower section of the contacting zone downwardly through passages 17. These slurry streams are combined in a collector 18 into a single slurry stream which passes downwardly through passage 19 into flow control device 20, constructed according to this invention. The flow control device, which effects separation of most of the oil from the adsorbent, is described in detail below. Oil from the flow control device 20 is pumped by means of pump 21, through passage 22, into passage 15, to be returned to the contacting zone within treater 12. The granular adsorbent passes from the flow control device 20 into a funnel-like collector 23 and then downwardly into the upper end of washer 24 by means of passage 25. The adsorbent, which is still wet with oil from the treater, passes downwardly through a washing or contacting zone within washer 24 as a columnar mass. A washing solvent is pumped from tank 26 by means of pump 27 through line 28 into the lower end of the washing zone within washer 24. Typical solvents suitable for the washing step include carbon tetrachloride, normal heptane, normal octane, petroleum naphtha boiling within the range 100–400° F. and carbon disulfide. A preferred solvent is a paraffinic naphtha boiling within the range about 210–300° F. The washing may be conducted below, at, or above atmospheric pressure and at any temperature below the temperature at which substantial vaporization of the solvent occurs; typically, a temperature within the range 60–250° F. might be used.

Solvent passes upwardly through the downwardly moving adsorbent to remove liquid oil therefrom. Conditions within the washing zone should be controlled so that substantial amounts of adsorbed impurities are not also removed from the adsorbent. The solvent-liquid oil mixture passes from the upper end of the washer through passage 29 into a fractionator 30. In the fractionator, solvent and liquid oil are separated, the solvent passing overhead as a vapor and being condensed by means of condenser 31 and returned to tank 26 through passage 32. The liquid oil is taken as bottoms and recharged to the treater by means of passages 33 and 15. The washing adsorbent is removed from the lower end of the washing zone through passage 34 at a rate controlled by flow control device 20', similar to device 20, designed according to this invention. Solvent is removed from the flow control device through passage 22' and passed into tank 26. Adsorbent passes into collecting funnel 23' and then downwardly through passage 35 into a drier 36.

The details of one suitable type of drier are described and claimed in U. S. Patent No. 2,813,352. In this drier, adsorbent is maintained as a boiling bed by means of a condensable stripping gas which enters the drier through passage 37. Heat is supplied to the boiling bed by indirect heat exchange with a suitable heating fluid admitted to tubes within the drier by means of inlet 38 and removed from the tubes through outlet 39. Stripping gas and solvent which has been vaporized pass from the upper end of the drier through passage 40 into a quencher 41, where stripping gas and solvent are condensed by means of cold water admitted through passage 42. The liquid materials are then passed into tank 26 by means of passage 43. The water and condensed stripping gas are removed from the lower end of the tank through passage 44. The dried adsorbent is removed from the drier through passage 45 and to the lower section of a conveyor 46. Conveyor 46 may be of any design suitable for transferring the granular material, for example, it may be a bucket elevator or gas lift. The adsorbent passes upwardly through the conveyor and is discharged into passage 47, from which it passes into kiln 48. Within the kiln the adsorbent is contacted with a suitable combustion supporting gas, such as air, which is admitted through passage 49. The combustion supporting gas is utilized to burn off the impurities on the adsorbent and flue gas is removed through passage 50. Suitable cooling coils 51 are provided within the kiln to control the temperature therein below the level at which the adsorbent would be permanently damaged. The revivified adsorbent is removed from the lower section of the kiln through passage 52 and is cooled by means of cooler 53 to the desired temperature for use in treater 12. Adsorbent is then elevated to a level above supply hopper 10 by means of conveyor 54 and passed into the hopper through passage 55.

One flow control device constructed according to this invention is illustrated in Figures 3 to 6, which will be considered together. Within a housing 56 is maintained a rotatably mounted circular screen 57, which lies in a substantial horizontal plane. This screen is connected by the support members 58 to a shaft 59, which extends to the exterior of housing 56. Shaft 59 coincides with the vertical axis of symmetry of screen 57. The shaft is connected by a reduction worm 60 to a motor 61, by means of which the shaft and screen may be rotated.

Figure 3:
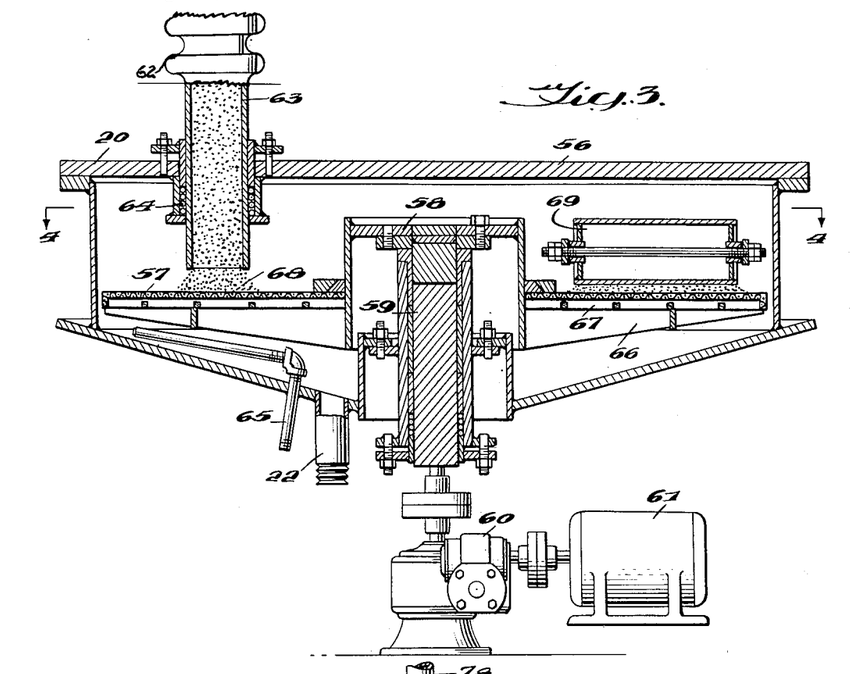
Figure 3 is an elevational view, partially in section, of one form of apparatus constructed according to this invention.
Figure 4:
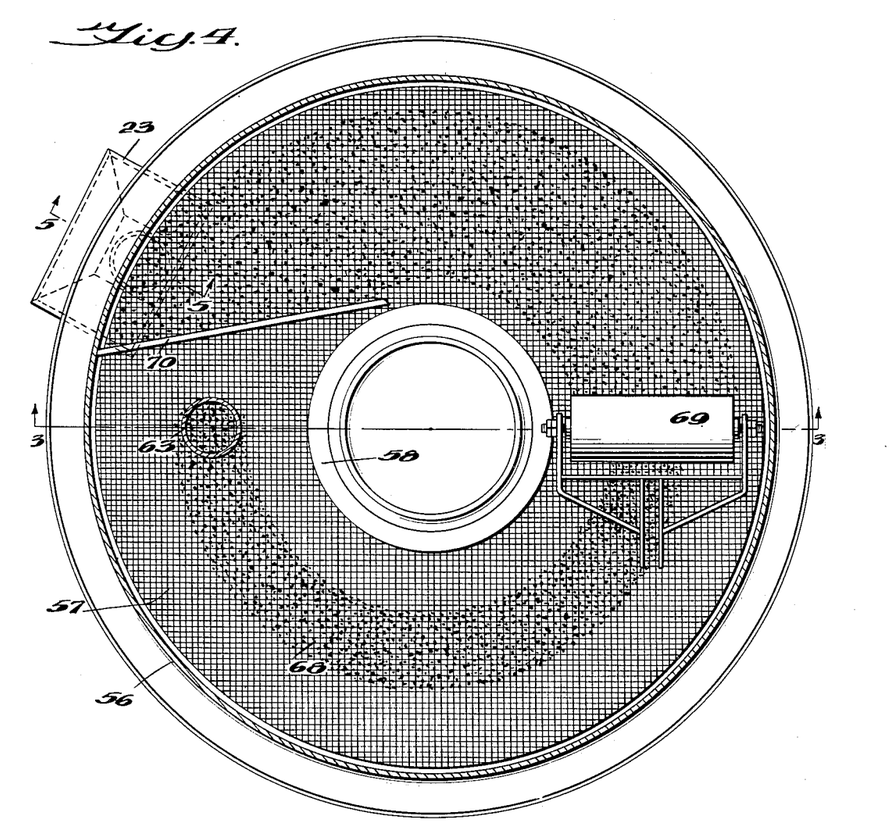
Figure 4 is a sectional view along line 4—4 of Figure 3.

The passage from the granular solids-liquid contacting zone, such as passage 19 of Figure 2, will connect to the upper end of expansion joint 62. Connected to the lower end of the expansion joint is conduit 63, which extends into housing 56 through a packing gland 64 and terminates above screen 57. A drain conduit 22 extends from the underside of housing 56 at a point below screen 57. Screen 57 is supported from member 58 by means of a plurality of bracing members 66, on which rests a grating 67 which supports screen 57 on its upper side.

Figure 6:
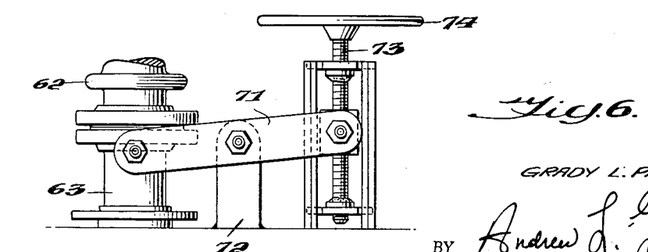
Figure 6 is an elevational view of one system for varying the height of the drain passage extending into the device of Figure 3.

In operation, the liquid-granular solids slurry passes from the contacting zone downwardly through expansion joint 62 and conduit 63. Screen 57 is continuously rotated by means of motor 61. The slurry stream issues from passage 63 onto the screen. Liquid passes through the screen into the lower section of housing 56, while the granular solids remain thereon and form an accumulation or pile 68. Sufficient liquid is removed from the slurry stream as it issues from the drain passage 64 by drainage through screen 57, that the character of flow of the slurry stream is altered from liquid type flow to that of a wet mass of granular solids which forms accumulation 68. Were the screen not moving, this pile would build up to a point where it blocked all granular solids flow through passage 63, although liquid would continue to flow downwardly through the pile and through the screen. However, since the screen is moving, pile 68 will be continuously moving out from beneath passage 63 at a fixed rate, thus allowing continuous granular solids flow. Any given part of the pile 68, as it moves around with screen 57, passes beneath a roller 69 which acts to flatten out the pile and cause further liquid to be forced out of the pile and through screen 57 into the lower section of housing 56. The granular solids then continue movement around with the screen until scraper 70 is encountered, which forces the granular solids from the stream into a collecting box 23, from which the granular solids may pass into the next step of the treating process. The flow rate of granular solids from the treating zone is controlled in this device by adjusting the distance between the lower end of pipe 63 and screen 57. One manner of accomplishing this is shown in Figure 6, where an arm 71 is pivoted at its center on support members 72, which is connected to the top of housing 56. One end of arm 71 connects to pipe 63 immediately below expansion joint 62. The other end of arm 71 connects through a yoke to a threaded shaft 73. Shaft 73 is supported on the roof of housing 56 by suitable members and is equipped with a hand wheel 74 at its upper end. Thus, by rotation of shaft 73, pipe 63 may be made to move upwardly and downwardly to vary its distance from screen 57.

Figures 5, 7:
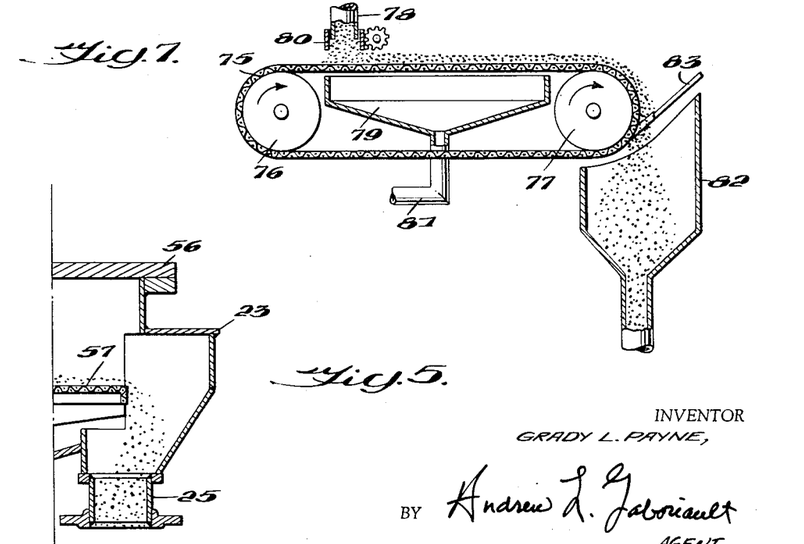
Figure 5 is a sectional view along line 5—5 of Figure 4.
Figure 7 is an elevational view, partially in section, of a second form of device designed according to this invention.

Another device capable of operation according to this invention is illustrated in Figure 7. There, a moving porous belt 75 is fitted around two drums 76 and 77. These drums are turned in some suitable manner to cause belt 75 to be continuously in motion. Liquid-granular solids slurry passes from the contacting zone downwardly through passage 78 to be discharged onto the moving belt 75. The liquid passes through the belt into collector 79, while the granular solids are retained thereon and form an accumulation which throttles the granular solids flow from passage 78 in the manner described above. The rate of flow of granular solids from passage 78 may be controlled by adjusting the height of sleeve 80, which fits around the lower end of passage 78, above the moving belt 75. This may be accomplished by the rack and pinion gear arrangement shown. Liquid may be removed from collector 79 through passage 81. The granular solids pass along with the moving belt and drop off onto a funnel-shaped collector 82. Scraper 83 may be provided to assist in removal of the solids from the belt.

Figure 8:
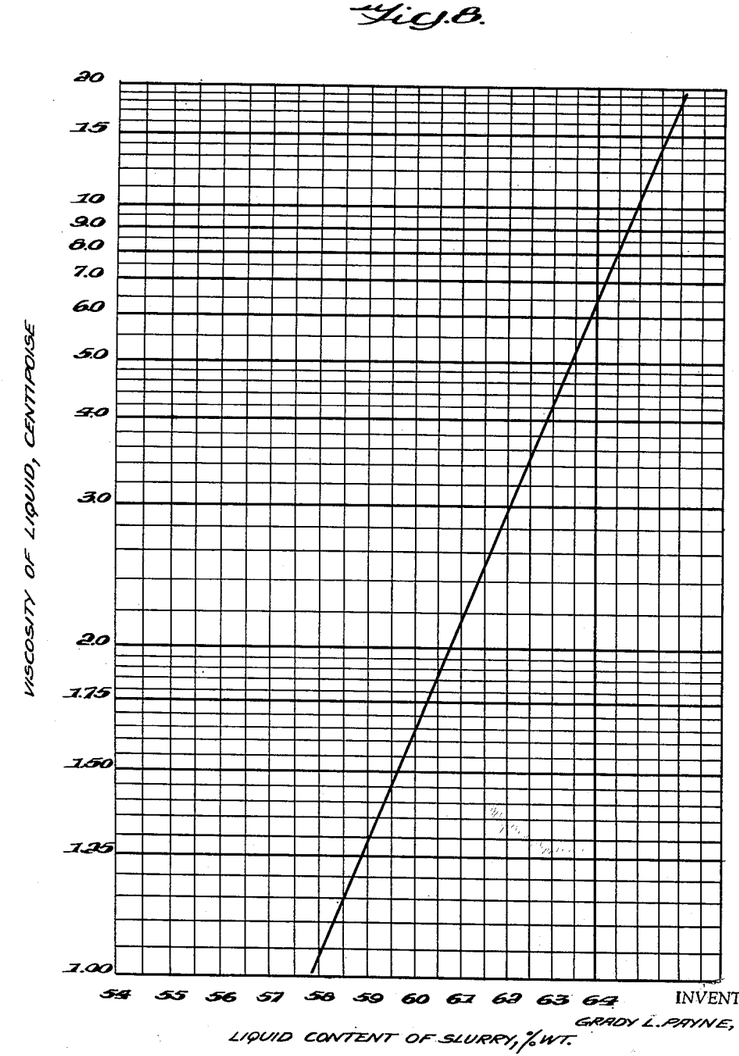
Figure 8 is a graph of the variation of the liquid content below which a slurry stream must be reduced in this invention with viscosity of the liquid.

In both of the previously described devices, as well as many other that may be constructed according to this invention, the liquid-granular solids slurry will flow downwardly from the contacting zone in liquid type flow. When the slurry is discharged onto the perforated surface formed by the screen or porous belt or other foraminous member, the character of flow is altered by removal of the liquid through the surface while granular solids are retained thereon as a wet mass to form an accumulation or pile which throttles the granular solids flow from the drain passage. Various operating conditions must be controlled in conjunction with each other, so that this granular solids accumulation will act as an impediment to flow or throttle. Among those are the linear velocity of the slurry in the drain passage, the distance between the lower end of the drain passage and the perforated surface, the size of the openings in the perforated surface and the rate of movement of the surface beneath the drain passage. All of these factors should be controlled in conjunction with each other to reduce the liquid content of the slurry stream as it issues from the drain passage to a level where the remaining contents of the stream assume the character of a wet mass of granular solids which then will act as a throttle. The level to which the liquid content of the stream must be reduced, as a minimum, to form the required accumulation, is a function of the viscosity of the liquid. This is shown in Figure 8. Any accumulation which will be suitable to impede granular solids flow from the drain passage must have a liquid content below that determined from Figure 8, and the slurry stream as it issues from the drain passage must be reduced in liquid content to at least the level determined by Figure 8. This graph may be expressed in the form of an equation as follows:

$$L = 100 V^{0.0217} - 54$$

where $L$ = maximum allowable liquid content of the accumulation below the drain passage as percent volume liquid and $V$ = viscosity of the liquid in centipoises.

Both the graph of Figure 8 and the foregoing equation are applicable to any type of liquid-granular solids contacting system. However, they are particularly applicable to systems where the liquid is a hydrocarbon having a specific gravity less than 1 and are most accurate for these liquids. The highest degree of accuracy of the graph and equation, independent of the type of liquid being used, is reached when the granular solids are about the size 30–60 mesh Tyler. For granular solids of different sizes the graph and equation are applicable with somewhat less accuracy. For larger solids, a somewhat higher liquid content than they give may be tolerated, while for smaller solids the allowable liquid content may be somewhat lower than the value given by the graph or the equation.

The rate of granular solids removal in a device of this invention is controlled by a combination of factors. The maximum capacity of any given unit is, of course, limited by the size of drain passage from the contacting zone. When this is fixed, the rate control is affected by the distance between the moving screen or belt and the lower end of the discharge passage, by the rate of movement of the screen or belt past the discharge passage and by the amount of granular solids which have been left by the scraper on the screen or belt. This last factor, of course, acts to decrease the distance between the lower end of the discharge passage and what might be termed the true perforated surface which can be said to consist of the screen or belt with any granular solids left thereon by the removal means. This is what forms the real perforated surface on which the slurry stream is discharged. The amount of granular solids left on the screen or belt also decreases the ease with which liquid may be separated from the slurry stream.

In controlling the rate, variation of the rate of movement of the perforated surface allows adjustment of the granular solids discharge rate within a narrow range. However, the preferred method of effecting rate control is to vary the distance between the porous surface and the lower end of the discharge passage in some manner, for example, those shown in the two devices discussed above. Broadly, this distance may vary from a minimum of 4 average particle diameters of the granular solids to a maximum of 1½ times the pipe diameter of the lower end of the discharge passage. Preferably, this variation should be from 8 average particle diameters to 1 pipe diameter. Reducing the clearance below the above minimum may cause substantial abrasion of the discharge pipe or moving screen by the solids. Operation above the maximum may cause the rate control to fail.

When a scraper is used to remove the granular solids, the clearance between the scraper and the moving belt or screen should be at least a distance equal to 4 average particle diameters of the granular solids for abrasive solids. This limit may be lower where the solids are non-abrasive and non-plugging. The scraper should preferably be placed as close to the screen as possible without being closer than the above limit, since the quantity of liquid drained decreases markedly when thick granular solids beds are allowed to remain on the moving screen.

The perforated surface through which liquid is drained may consist of any screen or porous material capable of retaining the granular solids on its upper surface. A preferred material is stainless steel woven wire screening having square or rectangular openings. The screen mesh size to be used will, of course, depend on the size of the granular solids. Table I gives preferred screen sizes for granular solids of varying sizes.

*Table I*

| Granular Solids Size | | Screen Opening | |
|---|---|---|---|
| Mesh | Average Particle Diameter, Inches | Mesh | Inches |
| 4-8 | 0.139 | 12 | 0.055 |
| 8-15 | 0.063 | 30 | 0.0214 |
| 15-30 | 0.032 | 60 | 0.0097 |
| 30-60 | 0.0155 | 100 | 0.0049 |
| 60-80 | 0.0079 | 150 | 0.0041 |
| 80-100 | 0.0054 | 200 | 0.0029 |
| >100 | | Porous Media | |

The perforated surface, particularly when it is of fine mesh, should be supported on an open grill work of maximum rigidity and maximum open area, so that proper drainage of the liquid will be effected while still preventing excessive distortion of the perforated surface. Also, drip points should be provided on this grill work to facilitate draining. As an example, a grating with 1-inch square openings has been found to be a suitable support for a 100 mesh screen while a 15 mesh grating was not suitable.

Both the examples of this invention discussed above have shown liquid draining through the perforated surface by the action of gravity. However, within the scope of this invention vacuum may be applied to the underside of the perforated surface to effect more rapid and complete draining. For any given device, the use of vacuum allows an increase in the maximum allowable linear velocity of the slurry in the drain passage, beyond which an accumulation of suitably low liquid content to act as an impediment to granular solids flow from the drain passage cannot be formed. This is due to the fact that the increased slurry velocities in the drain passage are associated with an increase in the proportion of liquid in the slurry. Thus, the maximum allowable velocity will be a function of the rate at which liquid can be removed from the slurry as it issues from the drain passage, which in turn is a function of pressure drop between the lower end of the drain passage and the underside of the perforated surface. Failure to remove sufficient liquid from the slurry as it issues from the drain passage will allow the slurry to remain in liquid type flow rather than to be altered to the character of a wet mass of granular solids. If this happens, no throttling by an accumulation of solids will be possible and effective rate control will be lost. Whether vacuum is used or not, the liquid content of the slurry stream must be reduced below that determined from Figure 8 and the equation associated therewith, in order that an effective control on the rate of solids removal can be accomplished. Likewise, the accumulation of solids which throttles the flow must have a liquid content below that determined as above.

This invention is not considered to be limited to any particular configuration of the various parts of the apparatus making up a device constructed according to this invention. Thus, if a rotating screen be used, it need not necessarily be circular but may be any other desired shape; a circular screen, however, is preferred.

Nor is the invention limited to the use of one drain or discharge passage in connection with the moving perforated surface, but if desired a plurality of such passages may feed to the surface. If a rotating screen is used, these passages should preferably be equal distances from the axis of rotation but within the broader scope of this invention they may be at varying distances from the axis of rotation.

It should be noted that the device of this invention has the advantage of not only controlling the rate of granular solids discharge from any liquid-granular solids treating zone, but also it acts as a drainer to recover substantial amounts of liquid which might otherwise pass to the next step of the treating process and either be lost or require elaborate means for recovery.

*Example.*—A device was designed according to this invention for use with a slurry of 30–60 mesh Attapulgus clay and liquid mineral oil of 5 centipoises viscosity. The discharge or drain passage consisted of a 4-inch vertical pipe. The perforated surface was a 4 foot diameter circular mesh screen capable of rotation about its center. Results obtained using this device under various conditions is shown in Table II.

*Table II*

| Distance from Pipe to Screen in Inches | Screen Speed Feed at Pipe Center Line | | Slurry Discharge Rate, Cu. Ft./Min. | Supernatant Oil | | Clay Bed on Screen | |
|---|---|---|---|---|---|---|---|
| | Ft./Min. | R. P. M. | | Total Vol., Cu. Ft./Min. | Percent Drained | Depth, Inches | Width, Inches |
| ½ | 15.7 | 2 | 0.192 | 0.0717 | 53.4 | ¼ | 6 |
| ½ | 30.8 | 4 | 0.269 | 0.0768 | 39.5 | ⅜ | 5 |
| ¾ | 15.7 | 2 | 0.285 | 0.0754 | 37.0 | ⅜ | 5¾ |
| ¾ | 30.8 | 4 | 0.50 | 0.1275 | 29.4 | ½ | 5⅝ |
| 1¼ | 15.7 | 2 | 0.818 | 0.188 | 35.5 | 1¼ | 7⅞ |
| 1¼ | 30.8 | 4 | 1.005 | 0.2231 | 33.5 | 1¼ | 8½ |

The effect of variation of the rate of screen movement past the lower end of the drain passage for this device is shown in Table III.

Table III

| Screen Speed—Linear Feed at Pipe Center Line | | Feed Pipe | | Distance from Pipe to Screen in Inches | Slurry Discharge Rate, Cu. Ft./Min. | Supernatant Oil | | Clay Pile | |
|---|---|---|---|---|---|---|---|---|---|
| Ft./Min. | R.P.M. | Number | Diameter in Inches | | | Total Vol., Cu. Ft./Min. | Percent of Total Drained Through Screen | Depth, Inches | Width, Inches |
| 22.0 | 4 | 1 | 1 | ½ | 0.141 | 0.0513 | 55.7 | 7/16 | 3 |
| 28.0 | 4 | 1 | 1 | ½ | 0.172 | 0.0689 | 49.0 | 7/16 | 3 |
| 33.6 | 4 | 1 | 1 | ½ | 0.198 | 0.0877 | 42.7 | 7/16 | 3 |
| 39.2 | 4 | 1 | 1 | ½ | 0.398 | 0.1103 | 52.0 | ½ | 4¼ |
| 30.8 | 4 | 4 | 1 | ½ | 0.667 | 0.2157 | 50.5 | ⅜ | 12 |
| 11.0 | 2 | 1 | 1 | ¾ | 0.164 | 0.0658 | 47.7 | ⅝ | 5 |
| 16.8 | 2 | 1 | 1 | ¾ | 0.597 | 0.2618 | 40.4 | ⅞ | 10 |
| 14 | 2 | 1 | 1 | 1 | 0.561 | 0.2574 | 41.8 | 1 | 11 |
| 15.4 | 2 | 4 | 1 | 1 | 0.777 | 0.2421 | 45.8 | ¾ | 13 |
| 30.8 | 4 | 2 | 1 | 1 | 0.688 | 0.2533 | 42.6 | 1 1/16 | 8 |
| 30.8 | 4 | 4 | 1 | 1 | 0.734 | 0.2846 | 36.5 | ½ | 12 |

It should be understood that it is intended to cover herein all changes and modifications of the examples of the invention herein chosen for purposes of disclosure which do not constitute departures from the spirit and scope of the invention.

I claim:

1. A method for the continuous withdrawal of granular solids at controlled rates from a liquid hydrocarbon-granular solids contacting zone, which comprises: passing a stream of granular solids-liquid hydrocarbon slurry in turbulent flow condition from the contacting zone downwardly through a confined passage; discharging the slurry from said passage onto a substantially horizontal perforated surface which is pervious to the liquid hydrocarbons but impervious to granular solids so that liquid hydrocarbons will pass through the surface while granular solids are retained thereon; rotating said surface about a vertical axis of rotation removed a substantial distance from the point of supply of the slurry to the surface; controlling the linear velocity of the stream in the drain passage, the distance between the lower end of the passage and the surface, the rate of rotation of the surface and the perviousness of the surface to liquid flow so as to cause an accumulation of wet granular solids to build up on the surface and throttle the flow of granular solids from the passage, which accumulation has an oil content less than that determined by the following equation:

$$L = 100V^{0.0217} - 54$$

where $L$ = liquid oil content of the accumulation as percent volume and $V$ = viscosity of the liquid in centipoises; and controlling the rate of discharge of granular solids from the passage by controlling the distance between the lower end of the passage and the perforated surface.

2. A method for the continuous withdrawal of granular solids from a liquid hydrocarbon-granular solids contacting zone at controlled rates, which comprises: passing a stream of granular solids-liquid hydrocarbon slurry in turbulent flow condition from the contacting zone downwardly through a confined drain passage, discharging said stream from said passage onto a continuously moving foraminous surface which is pervious to the liquid hydrocarbon but impervious to granular solids at a velocity such that the liquid hydrocarbon passes through the surface while granular solids are retained thereon, the velocity of discharge of said slurry being such that there is formed immediately below said passage an accumulation having a liquid hydrocarbon content less than that determined from the graph of Figure 8 for the viscosity of the liquid hydrocarbon, said accumulation acting to impede flow of granular solids from said passage, and controlling the rate of granular solids flow from said passage by controlling the distance between the lower end of the passage and the surface and the rate of movement of the surface in conjunction with each other.

3. A continuous process for the countercurrent contacting of granular solids and liquid hydrocarbons, which comprises: maintaining a columnar mass of granular solids within a confined contacting zone, supplying fresh granular solids to the upper section of said columnar mass, supplying liquid hydrocarbons to the lower section of the columnar mass and passing the liquid hydrocarbons upwardly through the mass to effect the desired contacting at a rate below that which would substantially disrupt the columnar mass, removing liquid hydrocarbons from the upper section of the contacting zone, removing granular solids admixed with liquid hydrocarbons from the lower section of the contacting zone and passing the hydrocarbon-granular solids mixture downwardly through an elongated passage in turbulent type flow, discharging the mixture onto a moving perforated surface which is pervious to the liquid hydrocarbons but impervious to the granular solids, maintaining the linear velocity of the mixture in the passage such that when the mixture issues from said passage the liquid hydrocarbons will pass through the perforated surface while the granular solids form a wet mass on the perforated surface immediately below said passage which has a liquid content less than that determined by the following equation:

$$L = 100V^{0.0217} - 54$$

where $L$ = maximum allowable liquid content of the wet mass on the surface as percent volume liquid and $V$ = the viscosity of the liquid hydrocarbons in centipoises, said wet mass substantially impeding downward flow of the granular solids through the passage, and controlling the rate of granular solids removal from the contacting zone through the passage by controlling the rate of movement of the surface and the distance between the passage and the surface in conjunction with each other at a rate suitable for effecting the desired contacting.

4. An apparatus for contacting liquid hydrocarbons and granular solids of a size within the range 4 to 100 mesh Tyler existing as a columnar mass, which comprises in combination: an enclosed contacting chamber, means for supplying liquid hydrocarbons to the lower section of said chamber and means for removing liquid hydrocarbons from the upper section of the chamber, means for supplying granular solids to the upper section of said chamber and said columnar mass, at least one elongated passageway for the removal of granular solids admixed with liquid hydrocarbons, a horizontal screen of a mesh size suitable to support the granular solids but to pass liquid through situated beneath the lower end of said passageway, said passageway terminating on its vertically downwardly faced lower end above said screen at a point removed from the vertical axis of symmetry of said screen, means for rotating said screen about its vertical axis whereby granular solids will be deposited on said screen while the liquid passes through the screen, a scraper positioned to remove granular solids from said screen at a point remote from said passageway, and means for adjusting the distance between the lower end of said passageway and said screen.

5. An apparatus for contacting liquid hydrocarbons and granular solids of a size within the range 4–100 mesh, which comprises in combination: an enclosed contacting chamber; means for supplying liquid hydrocarbons to the lower section of said chamber; means for supplying granular solids to the upper section of said chamber; means for removing liquid from the upper section of said chamber; at least one elongated passageway for the removal of liquid hydrocarbons extending downwardly from said chamber and terminating therebelow; a horizontal screen positioned beneath the lower end of said passageway of a mesh size suitable to support the granular solids but to pass liquid through; means for continuously moving said screen beneath the lower end of said passageway; an expansion joint situated intermediately along the length of said passageway; a substantially vertical threaded shaft supported exterior to said screen; a threaded yoke on said shaft; an arm attached at one end to said yoke and at the other end to said passageway beneath said expansion joint and pivoted between its ends; means for rotating said shaft whereby the lower end of said passageway may be moved vertically to adjust the distance between said passageway and said screen to adjust the rate of solids flow from said passageway.

References Cited in the file of this patent

UNITED STATES PATENTS

| Number | Name | Date |
|---|---|---|
| 417,546 | Cushman | Dec. 17, 1889 |
| 888,257 | Passburg | May 19, 1908 |
| 1,061,660 | Caldecott | May 13, 1913 |
| 2,034,784 | Wallny | Mar. 4, 1936 |
| 2,240,347 | Page et al. | Apr. 29, 1941 |
| 2,553,387 | Slama | May 15, 1951 |
| 2,631,727 | Cichelli | Mar. 17, 1953 |
| 2,673,176 | Whitney | Mar. 23, 1954 |
| 2,674,564 | Hermanson | Apr. 6, 1954 |
| 2,701,786 | Evans et al. | Feb. 8, 1955 |